United States Patent Office 3,389,776
Patented June 25, 1968

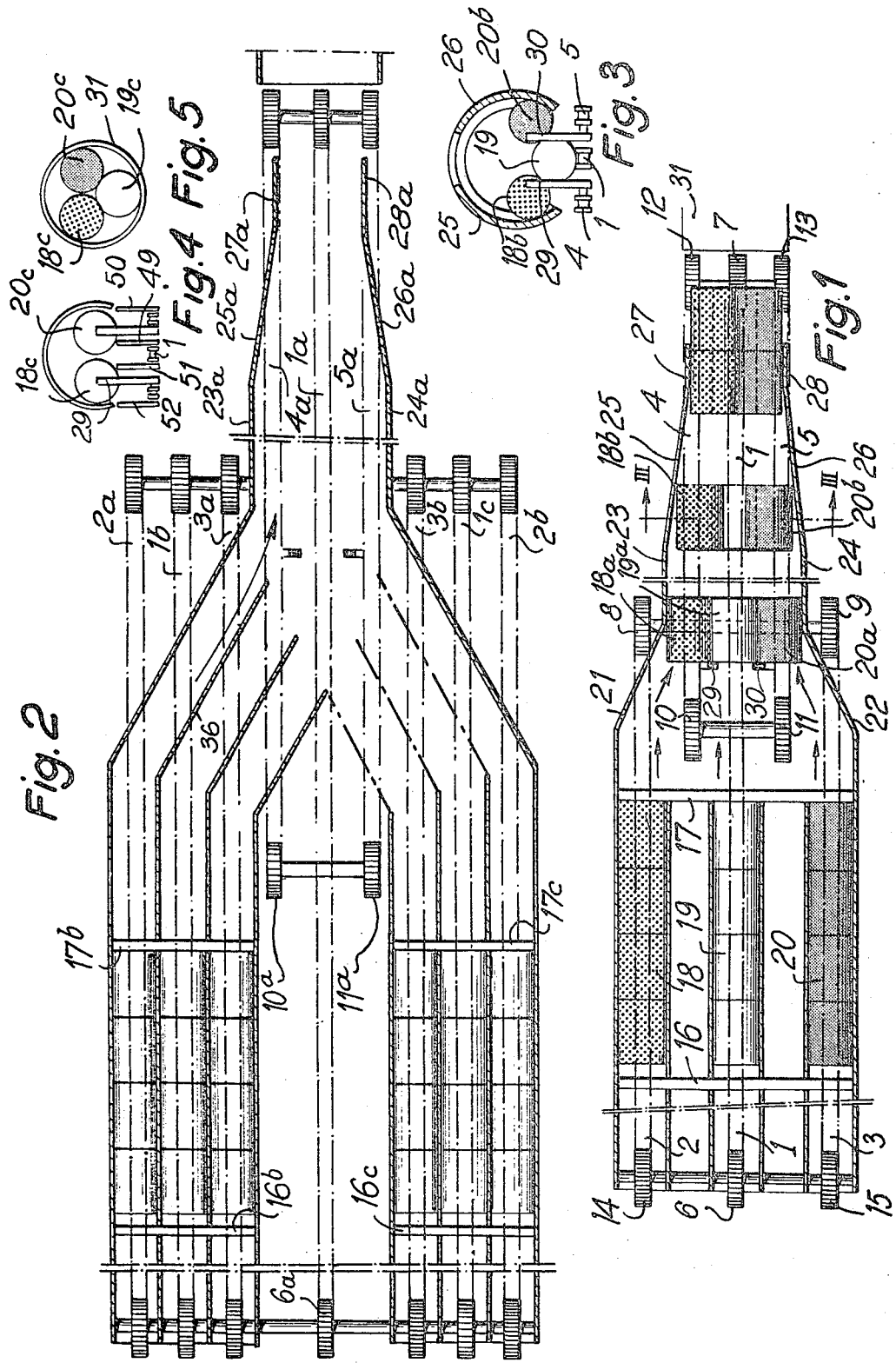

3,389,776
CONVEYOR APPARATUS AND MORE PARTICULARLY TO CONVEYORS FOR FOODSTUFF CONTAINERS
Pierre Carvallo, Amposta, Tarragone, Spain
Filed June 27, 1966, Ser. No. 560,525
Claims priority, application France, June 28, 1965,
22,543, Patent 1,449,779
9 Claims. (Cl. 198—30)

ABSTRACT OF THE DISCLOSURE

Container conveying apparatus in which a first conveyor axially transports a plurality of containers in endwise abutment in spaced rows to a second conveyor wherein a guide acts on the containers and juxtaposes the rows of containers while they are axially advancing to deliver the rows in a configuration having an outline in which they can be inserted into a cylindrical basket.

---

This invention relates to conveyor apparatus for containers such as food cans or flasks, and most notably to conveyors associated with continuous-type sterilizer-coolers.

The invention relates in particular to apparatus of this kind in which the containers to be processed are inserted into tubular baskets which are then moved through processing chambers.

Prior-art baskets of this kind have a circular cross-section with a diameter equal to the diameter of the container of largest size to be processed, a single row of containers being inserted into each such basket.

As a result, when processing small-size containers, the total volume of the bulk being processed in a sterilizer, for example, is significantly reduced.

It is the principal object of the present invention to overcome this drawback by providing apparatus in which conveyor baskets of the kind referred to are designed to receive one or more rows of containers and wherein such baskets are associated with mechanical means for inserting and extracting a plurality of such juxtaposed rows.

In order to clearly stress the advantages of such an arrangement, it may be pointed out that a tubular basket with an inner diameter of 166 millimetres will accept a row of cans of tinned food with an outer diameter of 158 millimetres, or two rows of cylindrical cans with a diameter of 80 millimetres, three rows of cans with a diameter of 76 millimetres, or four rows of cans with a diameter of 64 millimetres.

Considered from the viewpoint of production and transport capacity, the very considerable advantages of such an arrangement are thus clearly manifest.

In a preferred form of embodiment, a plurality of juxtaposed rows of cans are inserted automatically and simultaneously into such a basket by means of a series of conveyors of which at least one is equipped with container impelling and inserting catches, with said conveyors first offering up the contaners substantially in one and the same plane for the different rows. Said catches thrust the containers along suitably contoured guides which deflect the different rows into at least partial superimposition, which rows are then thrust into the corresponding basket.

When two rows are used, the insertion means may preferably include two carrier chains equipped with catches, and the axles of the sprockets over which said chains run are preferably adjustable in height at the insertion end.

In an alternative constructional form enabling three rows of containers to be inserted into the same basket, the arrangement may include with advantage three conveyor chains. The two lateral chains are equipped with catches. The three rows of containers are initially offered up substantially at the same level. Converging guides provided along the path of the catches cause the lateral rows to rise first and to subsequently meet above the middle row, which remains at the original level. This triangle arrangement permits snug insertion into the basket, and the impelling catches are wide enough to push two rows of cans simultaneously.

It will be noted that such an arrangement with three chains, for example, may also be used for handling a load consisting of two rows only.

The invention likewise includes the complementary apparatus for processing, within the same set of baskets, identical and different cans containing different products or different qualities of products which must not be mixed, whereby it is possible to feed, alternatively and selectively, the means for constituting the rows of containers and to position the latter in successive baskets. By way of example, in order to process two different kinds of cans, it is possible to feed a basket of each kind alternately, or two of one kind consecutively and then one of the other kind, or the process three kinds of cans, one at a time in turn.

There is accordingly provided, at the entrance to a superimposed-rows forming conveyor, a plurality of conveyors which arrange the rows in the same plane, for instance.

With such an arrangement, loading is effected by a selector device comprising one or more orientable vanes which direct containers holding the same product or the same quality of product towards the corresponding discharging conveyor.

The insertion catches referred to precedingly are preferably hingedly mounted to permit retraction thereof after insertion takes place. Such catches may be kept extended by equipping them with a heel portion operatively engaging with a guide formed with a break therein at the point where retraction is to occur.

The description which follows with reference to the accompanying non-limitative exemplary drawings will give a clear understanding of how the invention can be carried into practice.

In the drawings:

FIGURE 1 is a plan view with partial cutaway of a conveyor system adapted to receive three rows of cans and to juxtapose the same for insertion into a cylindrical basket.

FIGURE 2 is an alternative constructional form permitting alternating feed.

FIGURE 3 is a section taken through the line III—III of FIGURE 1.

FIGURE 4 is a view corresponding to FIGURE 3, in the case of a two-row feed.

FIGURE 5 is a schematic sectional view of the disposition of the cans positioned in a cylindrical basket.

Figure 6:
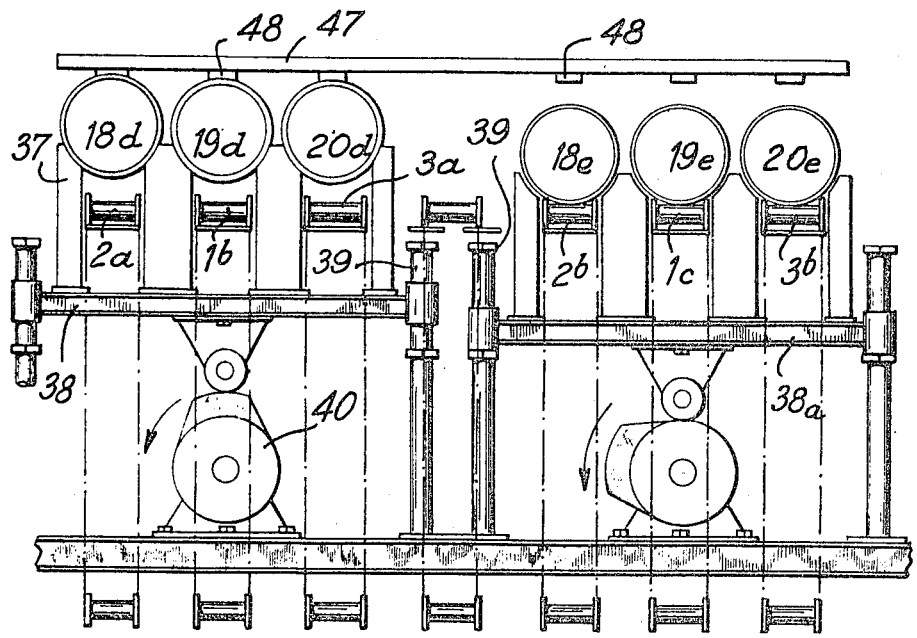

FIGURE 6 schematically illustrates a can arresting mechanism particularly usable with the row-forming conveyors of FIGURE 2.

Figure 7:
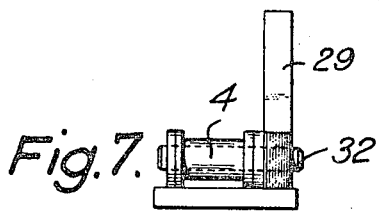
Figure 8:
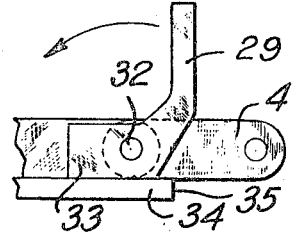

FIGURES 7 and 8 show in front and side elevation respectively the thrust catch hinging and latching mechanism associated with a conveyor chain.

Figure 9:
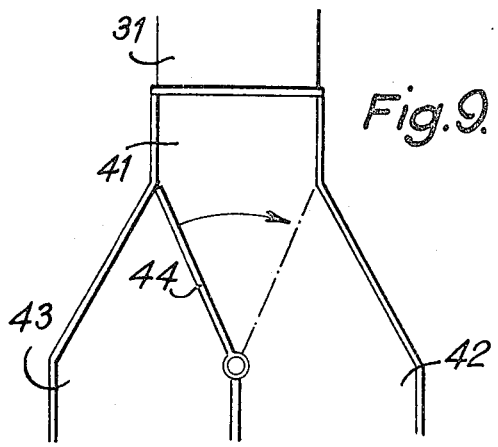
Figure 10:
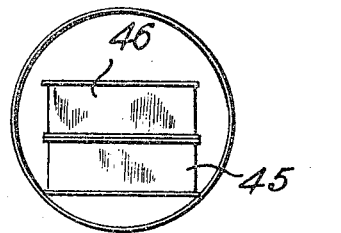

FIGURE 9 is a plan view of an exit switch for containers of two different kinds; and FIGURE 10 is a schematic illustration of two rectangular packages superimposed in a conveyor basket.

The apparatus illustrated in the drawings includes a conveyor with three chains, to wit a middle chain 1 with comparatively smooth surfaces and two first lateral chains 2 and 3. Downstream of the conveyor formed by chains 2 and 3 are positioned two more closely spaced lateral chains 4 and 5. Chain 1 is driven by end sprockets 6 and 7 over the entire length of both conveyor systems. Lateral chains 2 and 3 run over intermediate sprockets 8 and 9 upstream of which are located the sprockets 10 and 11 of chains 4 and 5. The other end sprockets 12 and 13 of chains 4 and 5 may be mounted on the same shaft as sprocket 7. The sprockets 14 and 15 of chains 2 and 3 can be mounted on the same shaft as sprocket 6. All the chains are thus driven in synchronism by suitable drive means (not shown).

Over that portion of the primary conveyor which is formed by chains 2 and 3 and the corresponding section of chain 1 are provided arresters 16 and 17 for the containers which are arranged in separate and parallel rows 18, 19 and 20. In the drawing, these rows are shaded differently to distinguish them from one another.

In the upstream portion of the secondary conveyor formed by chains 4 and 5 by the corresponding section of chain 1 are disposed lateral sectional guides 21 and 22 extending convergently from the exterior of chains 2 and 3 to the interior of chains 4 and 5. Guides 21 and 22 are extended by parallel guides 23 and 24 which are in turn succeeded by further convergent guides 25 and 26, themselves succeeded by parallel guides 27 and 28. With such an arrangement, the rows of cans 18, 19 and 20, of length equal to the distance separating arresters 16 and 17, can be restrained on the associated chains 2, 1 and 3 even while the latter are in motion. These rows are carried along by the chains as soon as arrester 17 retracts.

As they move forward, rows 18 and 20 encounter guides 21 and 22 and gradually leave chains 2 and 3 and move on to secondary chains 4 and 5, with each can in rows 18 and 20 moving into positions 18$a$ and 20$a$ in contact with a corresponding intermediate can 19$a$ which was left on middle chain 1. Guides 23 and 24 are spaced by a distance equal to the overall transverse dimension corresponding to these three containers juxtaposed in the same plane.

Lateral chains 4 and 5 are equipped with retractable impelling catches 29 and 30 of a width such that, having regard for their mutual spacing, they protrudingly bear against the rear of a can in row 19 and against the cans in rows 18 and 20 at the same time.

As they pass between guides 25 and 26, the lateral-row cans in position 18$b$ and 20$b$ are caused, by ramps rising above the chains, to be raised onto the corresponding intermediate can of middle row 19. They move out of contact with chains 4 and 5 but continue to be propelled by catches 29 and 30, the length of which is greater than the height of a can 19. As they continue to advance, the lateral cans cover the middle cans while continuing to remain in contact therewith, and ultimately achieve the configuration shown at 18$c$, 19$c$ and 20$c$ in FIGURE 5 and on the right-hand portion of FIGURE 1 whereby the three rows of superimposed cans are inserted in a triangular configuration into a cylindrical conveyor basket 31 of suitable diameter. The conveyor baskets 31 are adapted for the further conveyance of the cans for example in a sterilizer-collar of known type and shown in U.S. Patents 2,632,378 and 2,695,555.

As shown in FIGURES 7 and 8, catches 29 and 30 are each mounted on a link pin 32 of the corresponding chain and are formed with a heel portion 33 acting as a rocking counterweight, and this heel slides along a guide 34 coextensive with the chain run, there being a break in this support when the end-section 35 of the guide is reached.

Thus, through retraction of arrester 17 following transit of one of the pairs of catches 29 and 30 of chains 4 and 5, the rows of cans 18, 19 and 20 are advanced side by side on chains 1, 4 and 5. The rows have a length formed between arresters 16 and 17 equal to the permissible insertion length into a basket 31.

This length is then impelled by the subsequent catches 29 and 30, which catches have been brought into their extended positions. These cans are superimposed into a cluster and inserted fully home into a basket 31; at the same time, catches 29 and 30, having retracted, do not encounter the end-section of basket 31, which is adjacent sprockets 7, 12 and 13.

As is clearly shown in FIGURE 2, the secondary insertion conveyor formed by chain 1$a$ and two lateral chains 4$a$ and 5$a$ similar to those hereinbefore described, could be associated with a multiplicity of primary lateral conveyors. In the case illustrated for exemplary purposes in FIGURE 2, this association consists of two primary conveyors formed by lateral chains 2$a$, 3$a$ and 2$b$, 3$b$ and their respective middle chains 1$b$ and 1$c$. These lateral conveyors are equipped with arresters 16$b$, 17$b$ and 16$c$, 17$c$, respectively. Their chains extend from a common forward shaft mounting a sprocket 6$a$ for middle chain 1$a$ and sprockets for the lateral conveyor chains. A rear shaft supports the sprockets for the six chains of the lateral conveyors. Sets of partition walls 36 enable the containers being transported to be moved from either of the lateral conveyors on to the secondary conveyor which is equipped with guides 23$a$ and 24$a$, 25$a$ and 26$a$, 27$a$ and 28$a$, similar to those described precedingly. To this end, said partition walls surmount an adequately long portion of the secondary conveyor, the lateral chains of which are extended in an upstream direction whereby to run over sprockets 10$a$, 11$a$ located between the lateral conveyors.

Said partition walls may additionally include movable portions whereby to provide alternate switching. In operation, the retraction of arresters 17$b$ and 17$c$ and of 16$b$ and 16$c$ are alternated so as to feed the secondary conveyor alternately.

As shown in FIGURE 6, said arresters may consist of plates 37 flanking the primary conveyor chains. Plates 37 are supported on frames 38 slidably mounted on guides 39 and adapted to be actuated alternately by lifting cams 40. As is clearly shown, containers 18$d$, 19$d$ and 20$d$ on the left-hand side of FIGURE 6 have been lifted out of contact with chains 2$a$, 1$b$ and 3$a$, whereas, when frame 38$a$ is lowered, the containers 18$e$, 19$e$ and 20$e$ on the right-hand side of FIGURE 6 are carried along by the corresponding chains 2$b$, 1$c$ and 3$b$.

In the converse configuration, cans such as 18$e$ are arrested, whereas cans such as 18$d$ are entrained.

A cross-member 47, possibly fitted with damping blocks 48, insures positive retention of the containers.

Clearly, a similar mechanism could be utilized for the layout of FIGURE 1.

Apparatus of the kind described hereinabove insures great flexibility of operation since it is possible to fill the baskets with a single row of containers of maximum diameter, with two rows of containers of an intermediate diameter, or with three rows of containers of minimum diameter.

Where there is a question of different products, or different qualities that must not be mixed, recourse to the form of embodiment of FIGURE 2 will permit filling consecutive conveyor baskets in alternation, possibly with variously devised repetitions.

Such segregation at the end where the products exit from the baskets 31 is achieved by means of a discharge channel 41 which is divisible into two passageways 42 and 43, provision being made for a switch-vane 44 that permits entry into one passageway while preventing entry into the other.

Synchronized actuation of vane 44 insures appropriate selection.

The junction and superimposition of rows of different containers could be effected equally for containers of uniform diameter or for containers of different diameter within a given load. The cylindrical shape of the containers makes it easier to stack them in superimposed rows, with the containers rolling over one another as the transition takes place.

Similar arrangements could be used, however, for superimposing in the same tubular basket 31, rows of containers of any other shape, and most notably prismatic-shaped containers 45 and 46.

It goes without saying that many other changes and substitutions of parts could be made to the specific forms of embodiment hereinbefore described without departing from the spirit and scope of the invention. Thus, with a two-row feed system, it will be of advantage to make the exit sprockets of the secondary conveyor chains adjustable vertically opposite the entrance of a basket to be filled, or else to provide ramps 49 to 52, as shown in FIGURE 4.

What I claim is:

1. Apparatus for conveying containers comprising: first conveyor means for feeding a plurality of containers in endwise abutment in at least one row in a generally longitudinal direction, second conveyor means for feeding a plurality of containers in endwise abutment in a row in a generally longitudinal direction, guide means adjacent the first conveyor means at an intermediate location along its length for acting on the containers thereon to cause the containers to converge on the first conveyor means relative to the containers on the second conveyor means downstream of the guide means, ramp means adjacent the first and second conveyor means for elevating the containers of at least one of the rows, the ramp means acting in cooperation with the guide means for juxtaposing the rows of containers to form a stacked configuration thereof, and retractable catch means on one of said conveyor means for engaging the containers to advance the same on the ramp means.

2. Apparatus as claimed in claim 1, wherein said first conveyor means comprises a plurality of conveyors one for each row of containers and said guide means comprises guides for engaging the containers on the conveyors of the first conveyor means and causing convergence of the rows, the containers of which are lifted from their respective conveyors by said ramp means.

3. Apparatus as claimed in claim 1, wherein the first conveyor means includes at least two parallel spaced conveyors, which are spaced at a greater distance upstream of the guide means compared to downstream of the guide means.

4. Apparatus as claimed in claim 3, wherein said second conveyor means comprises a conveyor extending longitudinally between two conveyors of the first conveyor means.

5. Apparatus as claimed in claim 1, wherein said catches have a sufficient width to operate simultaneously on two rows of containers.

6. Apparatus as claimed in claim 1 comprising means supporting the catches for retraction including a guide extending longitudinally relative to said conveyor means, each catch including a heel portion engaged in said guide for retaining the catch in upright position, said guide having an interruption whereat the catch is retracted.

7. Apparatus as claimed in claim 1 comprising means positioned adjacent the first and second conveyor means upstream of the guide means for temporarily arresting the rows of containers.

8. Apparatus as claimed in claim 1 wherein said first conveyor means includes first and second sections upstream of the guide means for respectively supplying rows of containers, the apparatus further comprising means for feeding rows of containers from said sections in alternation.

9. Apparatus as claimed in claim 1, wherein the total number of said rows are three, the containers being cylindrical and said configuration which is formed having an outline which is inscribed in a cylinder.

References Cited

UNITED STATES PATENTS

| | | | |
|---|---|---|---|
| 2,817,196 | 12/1957 | Ringler | 53—159 |
| 2,897,947 | 8/1959 | Krupp | 198—28 |

RICHARD E. AEGERTER, *Primary Examiner.*

EVON C. BLUNK, *Examiner.*